UNITED STATES PATENT OFFICE.

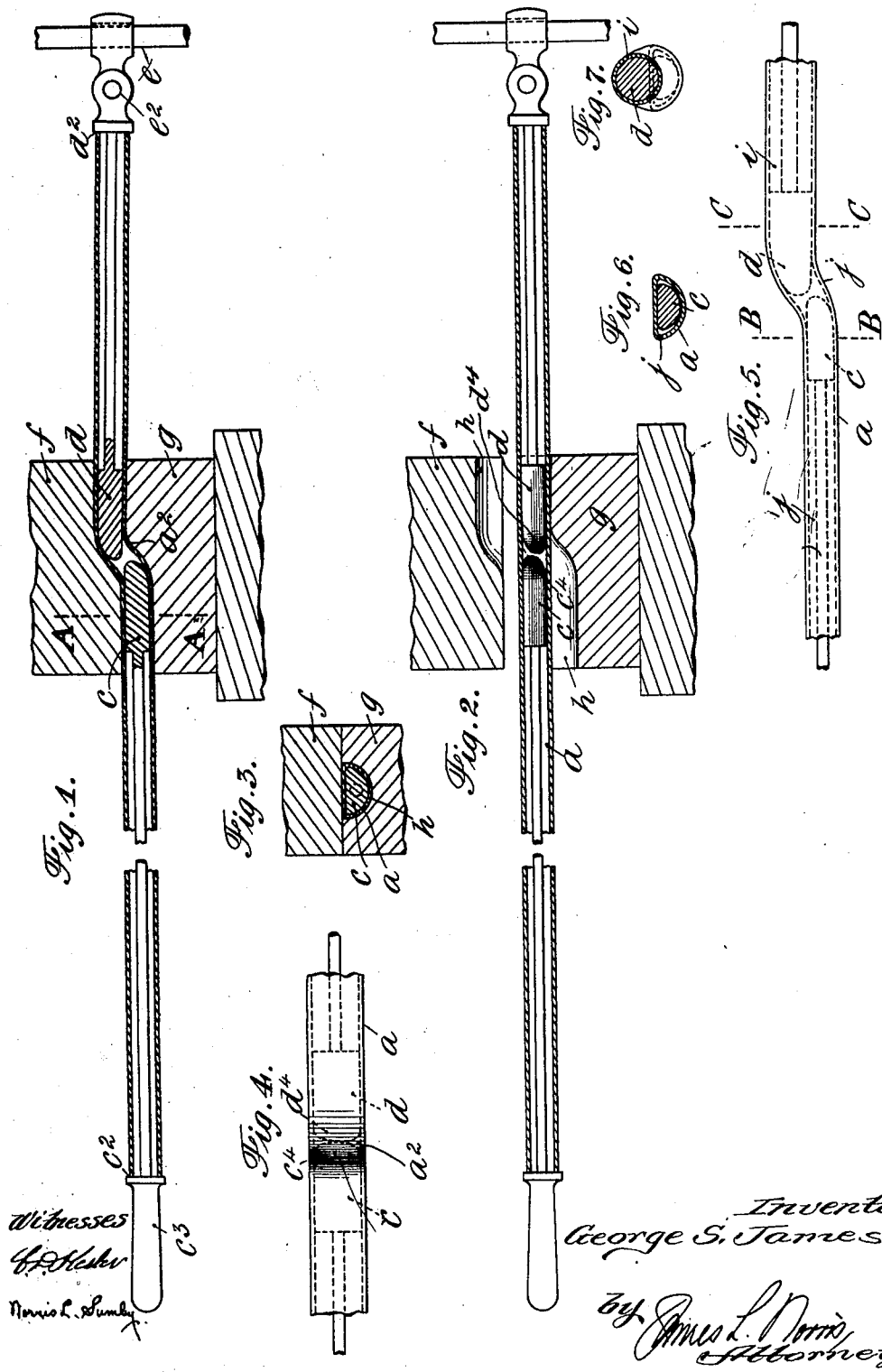
G. S. JAMES.
MANUFACTURE OF SEAT PILLAR STAYS AND CHAIN STAYS OF CYCLE FRAMES.
APPLICATION FILED OCT. 23, 1917.
1,308,591.
Patented July 1, 1919.

GEORGE STEWART JAMES, OF BIRMINGHAM, ENGLAND.

MANUFACTURE OF SEAT-PILLAR STAYS AND CHAIN-STAYS OF CYCLE-FRAMES.

1,308,591.  Specification of Letters Patent.  Patented July 1, 1919.

Application filed October 23, 1917. Serial No. 198,118.

*To all whom it may concern:*

Be it known that I, GEORGE STEWART JAMES, subject of the King of Great Britain, residing at 36 and 37 Ashted Row, Birmingham, in the county of Warwick, England, have invented certain new and useful Improvements in the Manufacture of Seat-Pillar Stays and Chain-Stays of Cycle-Frames, of which the following is a specification.

The invention relates to the shaping in a tube length of a cranked or like part such as provided in a seat pillar stay or a chain stay of a cycle frame for the purpose of forming the wheel forks.

Said cranked part is usually shaped between press or other tools while the tubular piece is internally loaded with resin or the like which needs to be melted out after the shaping demanding subsequent cleaning and trimming operations upon the tube length consequent upon the use of the loading material.

The invention provides a process for the purpose in which the cranked part of the tube length is shaped between suitable shaping tools while internally supported by two mandrels inserted into the tube one from each end to take up a position close together without overlapping. Said mandrels are cross sectionally shaped to the cross section of the tube, as for example, D shape if the tube is D shape or one D shape and the other circular if the parts of the tube each side the cranking are of such shapes, as for instance in the case of a chain stay. The formation of a curved cranking similar to an ogee curve is primarily the object of the invention in which case the mandrels at their active ends are shaped on their one sides to the curving as will be hereinafter described.

The invention will be clearly understood by the description hereinafter appearing with reference to the accompanying sheet of drawings.

Figure 1 shows a longitudinal section after the shaping in the D sectioned tube length has been effected.

Fig. 2 shows a similar section before shaping.

Fig. 3 is a cross section of Fig. 1 on the dotted line A—A.

Fig. 4 is a plan of a portion of the tube length Fig. 1.

Fig. 5 is a longitudinal representation of a cranked tube length of dissimilar cross sections each side the cranking and showing the mandrels in position.

Fig. 6 is a cross section of Fig. 5 on the dotted line B—B.

Fig. 7 is a cross section of Fig. 5 on the dotted line C—C.

With reference to Figs. 1 to 4 $a$ is a length of D sectioned tube in which the ordinary curved cranking $a^2$ is to be shaped, said tube length being suitable for a seat pillar stay for a cycle. Two mandrels $c$ and $d$ are inserted into the tube one from each end while the tube length is straight, as in Fig. 2, to take up positions quite close together without overlapping in any way at that part of the tube to be cranked. To position these mandrels they are pushed into the tube up to stops $c^2$ $d^2$ behind which latter is a handle $c^3$. The carrier $e$ for the mandrel $d$ is immovable longitudinally but permits of said mandrel rising and falling slightly and slightly swinging about the pivot $e^2$ and this carrier is conveniently placed to a pair of dies $f$ and $g$ operated by a press or in any other suitable manner and which are shaped to form the cavity $h$ to the longitudinal and cross shapes of the tube and cranking as clearly shown by Figs. 1, 2 and 3. The cavity $h$ of each tool is in the form of a semi-circular depression, the remaining portion of the working face of the tool being horizontally flat, each cavity extending across the tool a distance greater than one half the length of the tool and having its inner terminal in the form of a compound curved incline trending toward the flat face of the tool. Moreover, the cavities of the adjacent tools $f$ and $g$ are in relatively reversed positions, so that the cavity of one tool registers over the horizontal or flat face of the adjacent tool. By this means a comparatively abrupt bend or crank may be regularly formed in the tube length by the tools and the coöperating mandrel heads which are of the same form as the cavities and will be more fully hereinafter specifically explained. This cavity is very slightly larger all over than the cranking in the tube length to be shaped so as not to damage the cross section of the tube. The tube length $a$ is pushed over the mandrel $d$ up to the stop $d^2$ and then the mandrel $c$ is pushed into said tube length from its other end, after which the two dies $f$ and $g$ are brought together to shape the cranking either by one or two blows from a press, drop stamp, or the like.

It will be clear from the drawings that the mandrels $c$ and $d$ are cross sectionally shaped to the tube and longitudinally shaped at their active ends by suitable curvings $c^4$ $d^4$ which support the tube length oppositely during the curved cranking of it, Fig. 1 showing clearly how said active ends operate in the shaping of the cranking.

After the cranking has been shaped the tools are separated and both mandrels $c$ and $d$ are withdrawn one from each end of the tube length.

With reference to Figs. 5 to 7 relating to the curved cranking of a chain stay the tube length $a$ is at $i$ of circular cross section and at $j$ of D cross section and it is preferable to shape the straight length of tube to these two cross sections prior to the curved cranking process aforesaid although said cross sectional shaping may be performed from around to D at the portion $j$ during the curved cranking process. The mandrels $c$ and $d$ are shown within the tube length prior to being withdrawn.

The foregoing method or process of curved cranking is most effective being cheaper to carry out than the resin or like loading method and particularly advantageous inasmuch as it leaves the tube at the cranked part stronger than is the case if cranked while resin loaded for the reason that the metal of the tube is free to stretch and flow throughout the whole process of shaping the curved cranking.

Having now described my invention what I claim and desire to secure by Letters Patent is:—

Means for forming and shaping a bend or crank in a tube length comprising complemental external shaping dies arranged one over the other, each having a horizontally flat face and a semi-circular cavity extending lengthwise thereof a short distance beyond one-half of the length of the die, each of said cavities having its inner terminal inclined in compound curved form, said cavities being reversely arranged and each, for a greater portion of its length, being opposite to a portion of the horizontally flat face of the opposing die, and two mandrels insertible within the tube to be bent and having inner solid ends corresponding in cross-sectional contour to and of less dimensions than the cavities of the dies and having inner curved blunt ends, the mandrels being provided with flexible shanks extending from the outer ends thereof, the heads of said mandrels adapted to be arranged in reverse positions in the tube to be cranked or bent with their inner curved ends close together and respectively opposite the inner curved terminals of the cavities in the dies.

In testimony whereof I have hereunto set my hand in presence of two subscribing witnesses.

GEORGE STEWART JAMES.

Witnesses:
 GEO. T. FUERY,
 D. LEAKER.

Copies of this patent may be obtained for five cents each, by addressing the "Commissioner of Patents, Washington, D. C."